United States Patent [19]

Muehl

[11] 4,141,167

[45] Feb. 27, 1979

[54] WATERFOWL DECOY SETTING MEANS

[75] Inventor: Lawrence L. Muehl, Frankfort, S. Dak.

[73] Assignee: Dakota Cat Eye Inc., Frankfort, S. Dak.

[21] Appl. No.: 700,142

[22] Filed: Jun. 28, 1976

[51] Int. Cl.² .......................................... A01M 31/06
[52] U.S. Cl. ................................................ 43/2; 43/3
[58] Field of Search ................... 43/27.2, 42.72, 27.4, 43/3, 2

[56] References Cited

U.S. PATENT DOCUMENTS

| 1,836,504 | 12/1931 | Prince | 43/3 |
| 2,813,363 | 11/1957 | Leckner | 43/3 |
| 3,016,647 | 1/1962 | Peterson et al. | 43/3 |
| 3,525,173 | 8/1970 | Pickering | 43/42.72 |
| 3,664,054 | 5/1972 | Pickering | 43/27.4 |

Primary Examiner—Ronald E. Suter
Attorney, Agent, or Firm—Keith B. Davis

[57] ABSTRACT

A decoy set comprising an anchor, main line including at least one decoy, and a highly elastic band connected in series between the anchor and main line.

7 Claims, 5 Drawing Figures

WATERFOWL DECOY SETTING MEANS

BACKGROUND AND FIELD OF THE INVENTION

Briefly, the invention relates to decoys in general and in particular to waterfowl decoys for use in water.

Much effort and expense has been expended to perfect waterfowl decoys. Illustrative of such efforts are the inventions of Messrs. C. L. Weems and Paul D. Mays for Decoy Gang Actuating Mechanism set forth in U.S. Pat. No. 2,252,795 which issued Aug. 19, 1941, hereinafter Weems-May; of R. R. Majors for Anchor, U.S. Pat. No. 2,595,966 which issued May 6, 1951, hereinafter Majors; of W. G. Peterson and Eugene Cadwallader for Device for Attracting Wild Geese and Ducks as illustrated, described and claimed in U.S. Pat. No. 3,016,647 which issued Jan. 16, 1962, hereinafter Peterson-Cadwallader; of P. E. Miller who on July 3, 1956, was issued U.S. Pat. No. 2,752,715 for Animated Wildfowl Decoy, hereinafter Miller; of Joseph Coudon whose Device for Decoying Ducks was patented June 25, 1901, by U.S. Pat. No. 677,118 and whose Decoy Duck was patented Oct. 7, 1902, by U.S. Pat. No. 710,433, hereinafter respectively Coudon #1 and Coudon #2; of R. B. Prince for Decoy Duck Setter, U.S. Pat. No. 1,836,504 which issued Dec. 13, 1931, hereinafter Prince; of H. G. Beverman for Duck Decoy Support as disclosed in U.S. Pat. No. 2,624,144 which issued Jan. 6, 1953, hereinafter Beverman; of H. G. Wethall for the Floating Decoy of another U.S. Pat. No. 970,003 which issued Sept. 13, 1910, hereinafter Wethall; and, of J. Danz, Jr., for a Decoy Duck, U.S. Pat. No. 244,038 which issued July 12, 1881, hereinafter Danz.

Generally a set of decoys comprises a plurality of waterfowl replicas, all attached together by some form of interconnection means such as lines or cables. As illustrated by the Weems-May, Majors, Peterson-Cadwallader, Miller, Coudon #1, and Beverman inventions, it is generally thought that the authenticity of a decoy set is enhanced if the waterfowl replicas are animated. Beverman provides for a combination of swimming action and body movement, specifically, wing flapping. The Weems-Mays and Peterson-Cadwallader inventions each provide for movement of the decoy set to simulate swimming action.

Both Weems-Mays and Peterson-Cadwallader include a permanent anchor, either natural or artificial, to which decoys attached to a main line are attached, and an elastic band which is connected between the decoys and the permanent anchor. After the anchor is permanently emplaced, by pulling on the main line, the elastic band is stretched to move the decoys attached to the main line in one direction. Upon releasing the line, the band contracts and the decoys move in the other direction. Weems-Mays utilizes a series of side lines connected to but positioned at a right angle to the main line, and the decoys are attached to the side lines. In this way, individual decoys in a single decoy set are prevented from bunching up and a common direction formation swimming action is imparted to the decoys. The Peterson-Cadwallader invention includes a rigid frame to absolutely insure spaced apart separation of the individual decoys and the swimming action is again common direction, formation-like movement.

A general object of the invention is to provide a waterfowl decoy set.

An object of the invention is to provide a decoy set in which the decoys are animated.

Another object of the invention is a decoy set in which simulated swimming action is imparted to the decoys.

An additional object of the invention is a decoy set in which the swimming action of the individual decoys tends to be random.

A further object of the invention is a decoy set in which the individual decoy swimming action tends to be random yet in which the individual decoys tend to remain spread apart.

Yet another object of the invention is an animated, completely "shore-manned" decoy set, i.e., a set which can be placed in the water, maneuvered (swimming action imparted), and retrieved from the water, all without a person ever entering the water.

One object of the invention is a partly shore-manned decoy set which can be maneuvered and retrieved from shore.

Still an additional object of the invention is an animated, completely shore-manned decoy set in which the individual decoys tend to swim randomly, the individual decoys also tend to remain spread apart, and the decoys remain untangled.

BRIEF DESCRIPTION OF THE INVENTION

Briefly, the shore-manned decoy set of the present invention comprises a retrievable casting anchor, a main line to which one or more waterfowl replicas are attached, and a highly elastic band connected in series between the retrievable casting anchor and the main line.

Preferably, the main line is a water impervious rope and includes a plurality of attachment means along its length. Separate "wing lines" each similarly include attachment means along their lengths and an attachment means on one end for mating engagement with a main line attachment means. Individual decoys each carry a short cord having attachment means for mating engagement with main and wing line attachment means. The elastic band is of a material which stretches to six times its normal contracted length. The retrievable anchor ideally is snag-proof such that it can be dragged along the bottom and through water growth such as reeds.

The following are general parameters and specifications of the decoy set principal component parts. For the main line, a nylon rope of about seventy to two hundred test pounds is sufficiently flexible that it can be readily hand cast to place a decoy set in place. Conventional combination O-ring and snap fasteners, either plastic or metal, have been found to work well as attachment means. An elastic band of material known variously as "contest" and "surgical" rubber and which is commonly used in the construction of rubber powered balsa wood model airplanes has been found to readily provide the desirable "times six" elasticity and to be water impervious for at least the several months which are the length of a hunting season. A heavy plastic or polyethylene seamless bag and a capped, sand-filled pipe with caulking providing a smooth, tapered surface from the cap edges to the pipe exterior surface and a hole in one cap to accept one end of the main line would each suffice as a retrievable anchor.

DETAILED DESCRIPTION OF INVENTION

Figure 1:
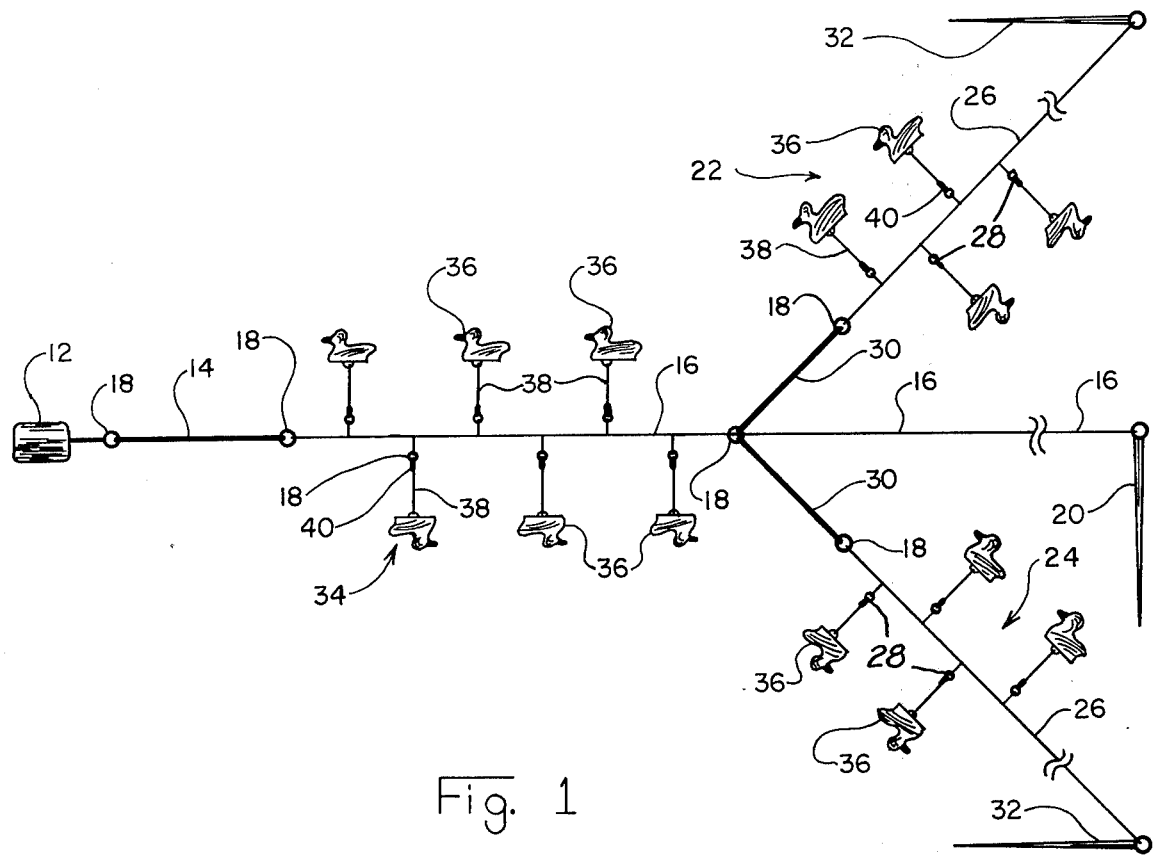
FIG. 1 is a plan view of a preferred embodiment of a decoy set according to the present invention.
Figure 5:
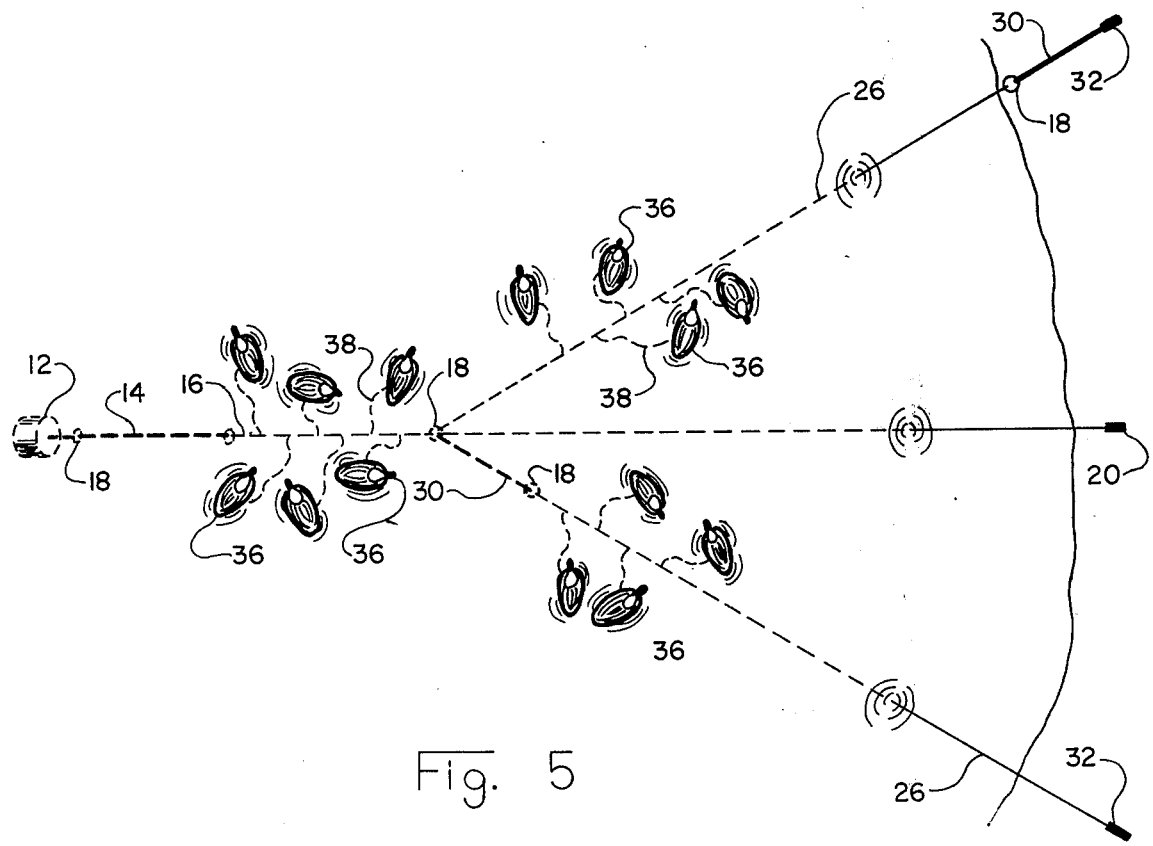
Figure 2:
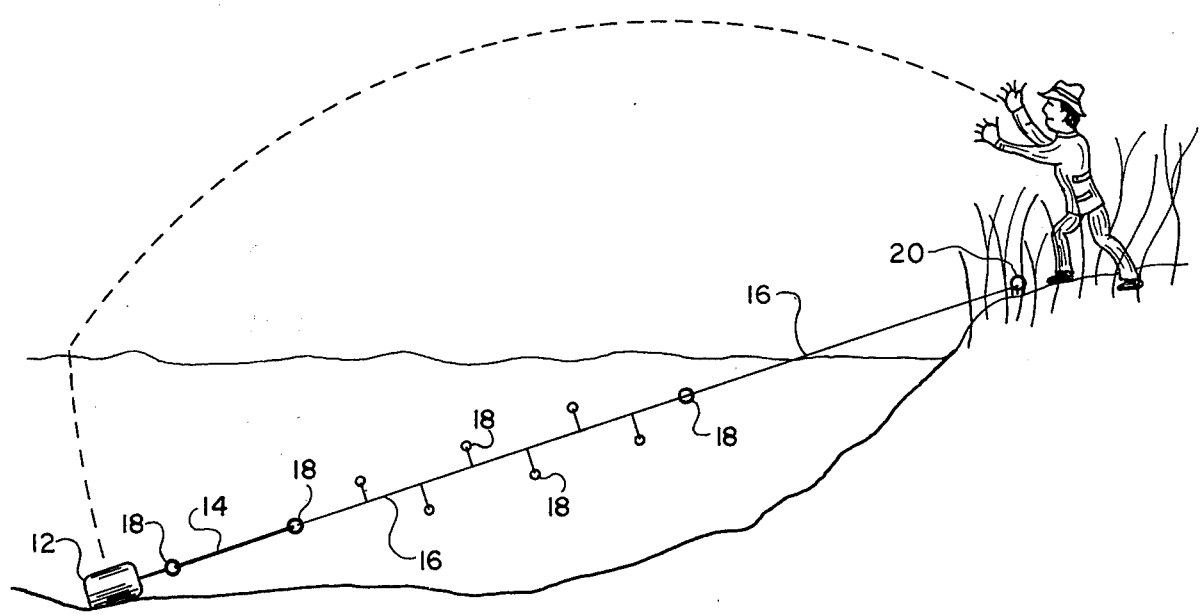
FIG. 2 is a diagramatic view which illustrates the initial phase of placing a decoy set according to the present invention in the water.

A preferred embodiment of the invention is illustrated in plan view in FIG. 1 where a duck decoy set is generally indicated as 10. Decoy set 10 comprises in series, a retrievable casting anchor 12, elastic band 14, and a main line 16. Main line 16 includes a plurality of O-rings 18 and a permanent anchor 20 on its on-shore end. Also included in decoy set 10 are a pair of wing lines shown generally as 22 and 24, and each of which comprise a cable 26 and include a plurality of O-rings 28, an auxiliary elastic band 30, and a permanent anchor 32. The order of connection of the auxiliary band 30 and cable 26 is not critical, and can be reversed as illustrated in FIG. 5. A plurality of individual duck decoys one of which is shown generally as 34 are attached to the main line O-rings 18 and wing line O-rings 28. Each individual decoy comprises a floatable waterfowl replica 36, short cord 38 attached on one end to the replica 36 and carrying on its other end a snap 40 for attachment to an O-ring.

Table 1 below is a list of the materials used to construct fully operative prototypes of the duck decoy set according to FIG. 1.

TABLE I retrievable casting anchor 12: one-half of a brick the out of water weight of which was about two or three pounds;

elastic band 14: a thirteen foot length of ¼ by 0.030 inch flat contest rubber manufactured and sold by the Sig Manufacturing Company of Montezuma, Iowa and known generally in the trade as rubber strip;

main line 16: seventy foot length of one hundred (100) lb. test nylon rope, about 1/32 inch in diameter;

O-ring 18 and 28: ½ inch outside diameter steel flat washer attached with a two inch length of the above nylon rope to the main and wing lines;

permanent anchor 20 and 32: improvised willow sticks about one inch in diameter;

cable 26: about a forty-five foot length of the same rope as main line 16;

auxiliary elastic band 30: an eight foot length of the same material as band 14;

replica 36:

in one instance, a total of six decoys on the main line, each individual decoy a Featherlite model 18½ oz. decoy manufactured by the General Fibre Company of St. Louis, Missouri; it is expected that a complete set of fourteen decoys including eight wing line Featherlite 18½ oz. decoys would also work well;

in another instance, a full decoy set of fourteen decoys, each a thirteen and one-half oz. Carry-Lite model decoy manufactured by the Carry-Lite Corporation, 3000 West Lake, Milwaukee, Wis. 53245, was used; and, in another instance, a full decoy set of fourteen decoys consisting of six of the 18½ oz. Featherlite decoys on the main line and a mixture of the 13½ oz. Carry-Lite decoys and a 2½ oz. Airlite model decoy manufactured by the Gibson Company (now the TETRA Company of Midland, Texas, P.O. Box 3170, zip code 79701) made up the eight wing line decoys;

cord 38: eighteen inch length of the same rope as line 14;

snap 40: conventional fishing tackle swivel snap; snaps ranging in size from about one-half to an inch and one-half in length were used successfully.

Figure 3:
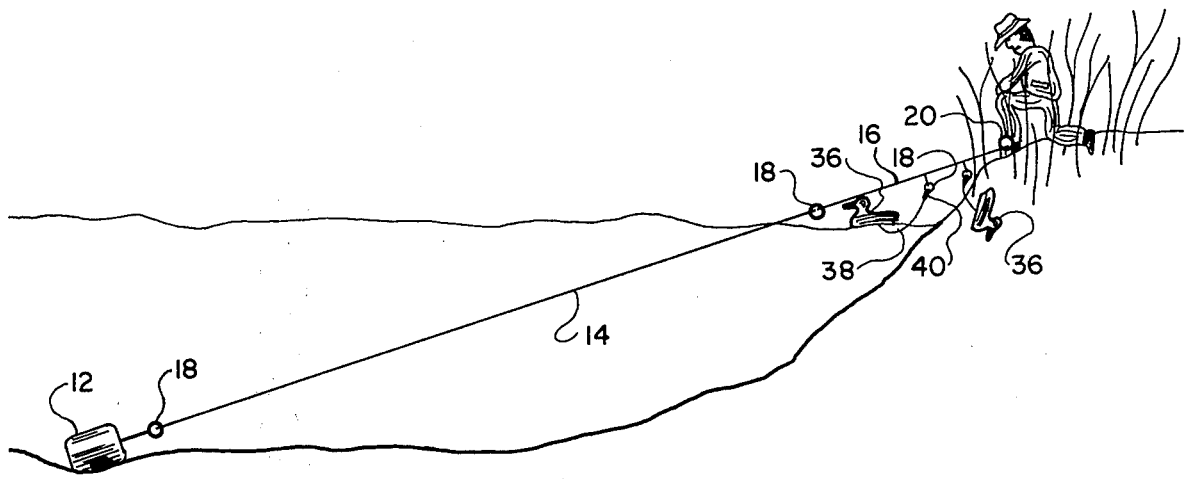
FIG. 3 is a diagramatic view which illustrates an intermediate phase of placing a decoy set according to the present invention in the water.
Figure 4:
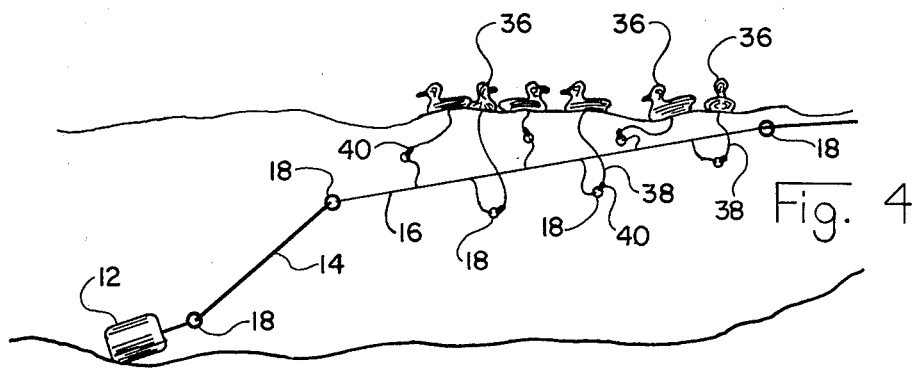
FIG. 4 is a diagramatic view of a section through the water which illustrates the retrievable anchor, elastic band, and a portion of the decoys of a decoy set fully in place in the water; and, FIG. 5 is a top plan view of a decoy set fully in place in the water.

To place a decoy set in the water, the shoreline end of the main line is held in one hand, or otherwise secured, and the retrievable casting anchor, with the elastic band and main line attached, cast out over the water beyond the emplacement position of the decoy set a distance about the length of the normal contracted band but in all events a total distance not greater than slightly further than the fully expanded length of the elastic band. After so casting the anchor and main line, the main line is retrieved, thereby stretching the elastic band until the person has in hand the furthest outward point on the line at which a decoy is to be attached. See FIG. 3. The decoys are attached to the main line 16 at this and the other points spaced on the line progressively closer to shore and the wing lines 22 and 24 are attached. As the attached decoys are set in the water and the main line released, the highly elastic band contracts and pulls the decoy set into position on the water. See FIG. 4. The main line permanent anchor 20 is made fast, as are the wing line permanent anchors 32. By attaching the decoys in this sequence, attaching the outwardmost decoys first and setting each decoy in the water immediately after it is attached, the possibility of the decoys becoming entangled is minimized. Under conditions that make entanglement a likely possibility, such as if more than the fourteen decoys of the embodiment of FIG. 1 are employed, anti-entanglement modifications to the embodiment can be made. It is believed that spacing the decoys further apart, using shorter connecting cords 38, and using a stiffer, more rigid cord 38, perhaps even a wire, would each act as an anti-entanglement measure. To impart swimming action to the decoys, main line 16 is alternatively pulled on and released. Because the decoy set includes the wing lines, the individual decoys tend to simulate a random rather than rigid formation swimming action and the wing line auxiliary elastic bands, by pulling on and releasing a wing line either alone or in combination with either or both another wing line or the main line imparts an even more random swimming action to the decoys. To retrieve a decoy set, main line 16 is pulled in and the individual decoys removed. By following the reverse of the emplacement procedure, removal of the shorewardmost decoy first, retrieval of the decoys is similarly entanglement free. The main line can then be released and the barren main line and wing lines left in the water until time to again attach the individual decoys, or the set completely removed by pulling in elastic band 14 to tow in the retrievable anchor. It is thus apparent that all of the foregoing can be accomplished completely from shore without a person ever setting foot in or going on the water. And, in those instances in which the terrain makes it desirable to emplace a decoy set beyond a person's casting distance, or more than six times a practical length of the elastic band, or otherwise so far from the shore that a person must emplace the set by wading into the water or going out on the water in a boat, the decoy set can nonetheless be retrieved entirely from shore.

It is to be understood that the foregoing is given by illustration and not limitation and that the true scope of the invention encompasses all equivalent means for practicing and carrying out the invention disclosed herein. For example, again by way of illustration and not limitation, the wing lines 22 and 24 can be offset, i.e., positioned at different main line attachment points, or connected in the opposing relationship illustrated but at a point other than the shoremost connection point.

What is claimed is:

1. A decoy set comprising:
   (A) a retrievable casting anchor;
   (B) at least one main line;
   (C) an elastic band which stretches to at least six times its normal, contracted length connected in series between the anchor and main line and having an elastic limit greater than the in-water weight of said anchor;
   (D) at least one decoy attached to said main line; and,
   (E) at least one wing line attached to said main line and comprising a permanent anchor, a cable, and an auxiliary elastic band connected in series and at least one decoy attached to said wing line.

2. A decoy set according to claim 1 wherein said auxiliary elastic band is connected in series between said main line and said cable.

3. A decoy set according to claim 1 wherein each said decoy carries thereon a short cord having an end including attachment means for mating engagement with a main line or wing line attachment means.

4. A decoy set according to claim 1 wherein said main line comprises a nylon rope having a test strength in the range of about seventy to two hundred pounds.

5. A decoy set according to claim 4 wherein said elastic band has an elasticity of at least six times the band's normal contracted length.

6. A decoy set according to claim 5 wherein there are a pair of wing lines, both wing lines are connected at a common point about twelve feet from the connection of said main line to said elastic band; said elastic band is about 7/16 inch by 0.004 inch, by twenty foot length of contest rubber, said main line is a one hundred foot long, 150 pound test nylon rope, each said wing line cable is 150 pound test nylon about seventy five feet long and each said wing line auxiliary elastic band is about eight feet long and has about the same elasticity as said main line elastic band.

7. A decoy set according to claim 1 wherein said retrievable casting anchor comprises a snag proof anchor.

* * * * *